US006685153B2

(12) United States Patent  
Foreman

(10) Patent No.: US 6,685,153 B2
(45) Date of Patent: Feb. 3, 2004

(54) RESTRAINING SYSTEM AND METHOD

(76) Inventor: Marc Franklin Foreman, 23376 Ostronic Dr., Woodland Hills, CA (US) 91367

( * ) Notice: Subject to any disclaimer, the term of this patent is extended or adjusted under 35 U.S.C. 154(b) by 29 days.

(21) Appl. No.: 09/972,734

(22) Filed: Oct. 6, 2001

(65) Prior Publication Data

US 2003/0066939 A1 Apr. 10, 2003

(51) Int. Cl.$^7$ ................................................ A47K 1/08
(52) U.S. Cl. ................ 248/313; 24/16 PB; 248/74.3; 248/505
(58) Field of Search ..................... 248/499, 505, 248/500, 510, 311.2, 313, 315, 310, 312, 154, 74.3, 74.4, 805; 24/20 CW, 20 S, 20 W, 279, 287, 16 PB, 17 A, 17 B, 17 AP

(56) References Cited

U.S. PATENT DOCUMENTS

| | | | | |
|---|---|---|---|---|
| 1,986,748 A | * | 1/1935 | Pritchard | 24/274 R |
| 3,579,754 A | * | 5/1971 | Oetiker | 24/279 |
| 3,966,154 A | * | 6/1976 | Perrault et al. | 24/269 |
| 4,304,383 A | * | 12/1981 | Huston | 248/313 |
| 4,754,941 A | * | 7/1988 | Weiss | 248/313 |
| 4,997,157 A | * | 3/1991 | Sweeny | 248/310 |
| 5,170,540 A | * | 12/1992 | Oetiker | 24/20 CW |
| 5,487,518 A | | 1/1996 | McCraney et al. | |
| 5,522,571 A | * | 6/1996 | Simmons | 248/59 |
| 5,607,133 A | | 3/1997 | Markham et al. | |
| 5,746,405 A | | 5/1998 | Dvorak et al. | |
| 5,897,086 A | | 4/1999 | Condon | |
| 5,906,302 A | * | 5/1999 | Spergel | 224/250 |
| 5,971,336 A | * | 10/1999 | McCraney | 248/154 |
| 6,145,796 A | | 11/2000 | McCraney | |
| 6,202,977 B1 | | 3/2001 | Chapman | |
| 6,254,051 B1 | | 7/2001 | Hubbard et al. | |
| 6,254,052 B1 | | 7/2001 | Hubbard et al. | |
| 6,349,904 B1 | * | 2/2002 | Polad | 24/16 PB |
| 6,355,887 B1 | * | 3/2002 | Gretz | 174/135 |
| 2002/0038495 A1 | * | 4/2002 | Anthes et al. | 24/279 |

* cited by examiner

Primary Examiner—Leslie A. Braun
Assistant Examiner—Tan Le
(74) Attorney, Agent, or Firm—Henricks, Slavin & Holmes LLP

(57) ABSTRACT

A restraint system that includes at least two bands with integral lock structures that mechanically interlock with one another during installation.

26 Claims, 10 Drawing Sheets

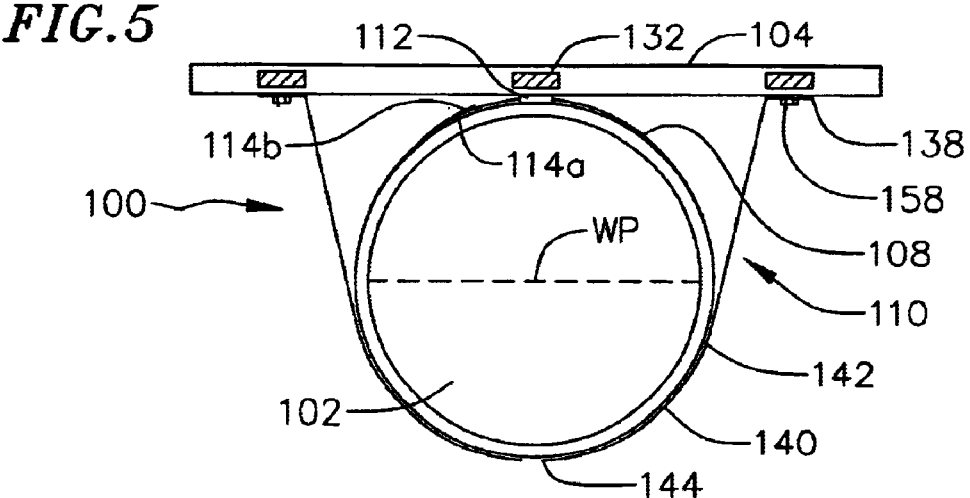
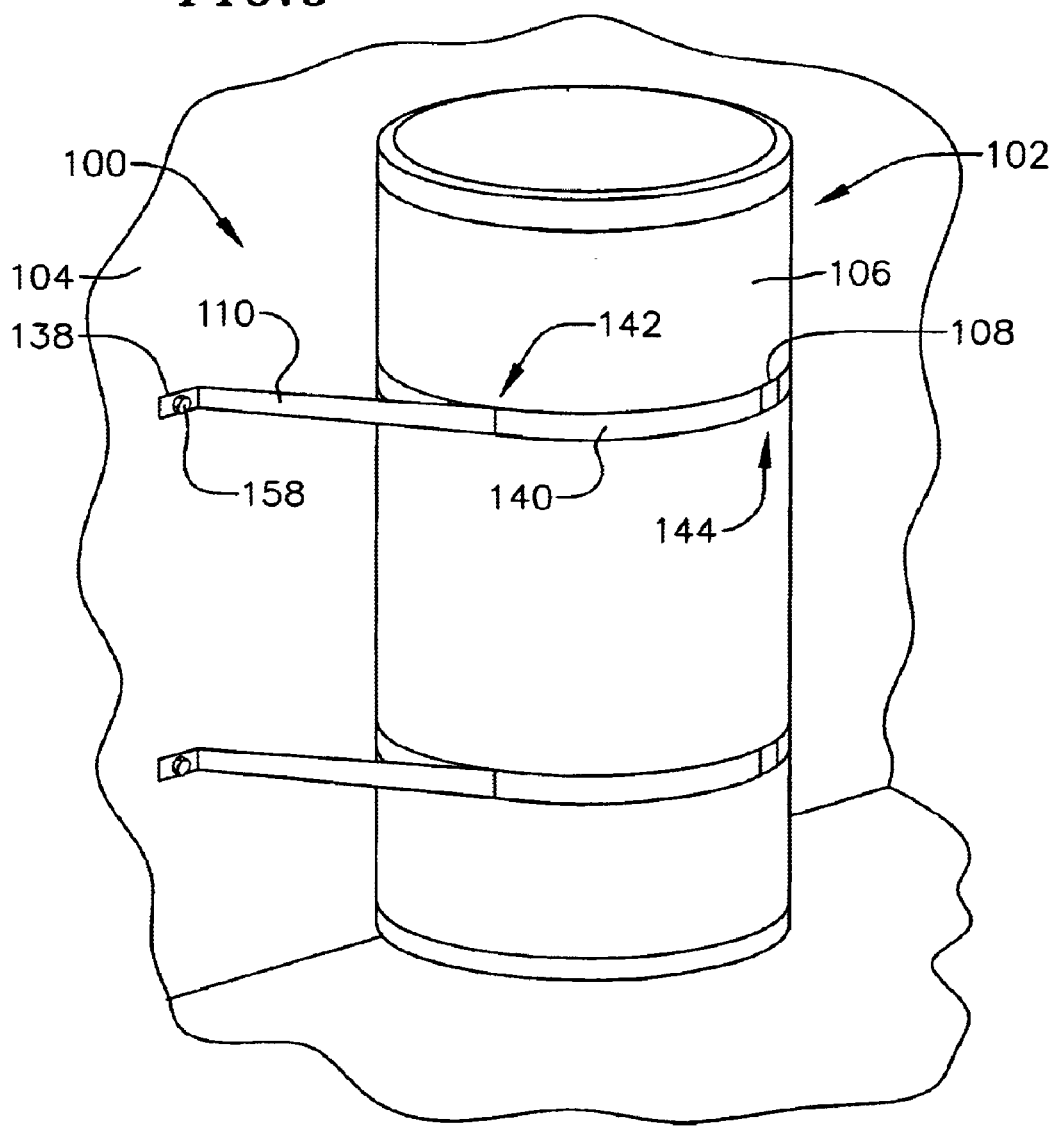

RESTRAINING SYSTEM AND METHOD

BACKGROUND OF THE INVENTIONS

1. Field of Inventions

The present inventions relate generally to restraining systems and methods and, more specifically, to restraining systems and methods that may be used to restrain relatively large objects.

2. Description of the Related Art

There are many instances where large objects must be secured to a support structure such as a wall or otherwise restrained. Although the present inventions are not limited to use with any particular type of object, one example of a large object that must be restrained is a water heater. Water heaters are commonly gas fired and include a main burner that heats water stored in a large cylindrical tank, an electronic control system, and a pilot burner that the control system uses to ignite the main burner. The burners are connected to a gas line and the control system is connected to a source of electrical energy with suitable electrical wiring. Due to the presence of gas and electricity, there is a serious threat of fire, explosion, and/or electrocution if the gas line is disconnected and/or the electrical wiring is breached when a water heater falls over, moves horizontally along the floor, or spins in place. A typical residential water heater stores 40 to 50 gallons of water, while some larger water heaters store 100 gallons of water. As such, flooding is also possibility when a water heater falls over.

The risk of water heater movement is particularly acute in areas where earthquakes occur. To that end, the laws of the state of California require that all new and replacement water heaters, and all residential water heaters, "be braced, anchored or strapped to resist falling or horizontal displacement due to earthquake motion." [California Health and Safety Code Section 19211(a).] The Uniform Plumbing Code similarly requires water heaters to be strapped at points within the upper one-third and lower one-third of their vertical dimensions. [Uniform Plumbing Code Section 510.5(e).]

A variety of water heater restraining systems have been introduced in order to prevent water heater movement. These systems typically include a pair of vertically spaced restraints that wrap around the water heater such that they each engage approximately one-half of the water heater circumference. The free ends of the restraints are secured to an adjacent wall. Because the diameter of water heaters and the distance between the water heater and the wall can vary from heater to heater, some restraint systems allow the length of the restraints to be selectively adjusted. Here, each restraint consists of a pair of bands that may be connected to one another at different points along their length.

The inventor herein has determined that conventional restraining systems are susceptible to improvement. For example, the inventor herein has determined that conventional restraining systems can be difficult to install because the devices that are used to connect the bands to one another include a plurality of separate parts that are difficult to attach to the bands and easy to drop or lose during installation. In addition, the connecting devices employed in conventional restraining systems typically connect the bands at a single point along their respective lengths, which can create weak points in the restraining systems and lead to failure.

SUMMARY OF THE INVENTIONS

A restraint system in accordance with a preferred embodiment of a present invention includes at least two bands with integral lock structures that mechanically interlock with one another during installation. There are a variety of advantages associated with such a system. For example, there is no need for the separate connecting devices associated conventional systems that are difficult to attach and easy to drop or lose during installation. In one implementation of the present inventions, each band includes a plurality of lock structures which together provide a plurality of band connection points. Such an arrangement provides a stronger connection than a single connection point and, therefore, reduces the likelihood of connection point failure.

The above described and many other features and attendant advantages of the present inventions will become apparent as the inventions become better understood by reference to the following detailed description when considered in conjunction with the accompanying drawings.

BRIEF DESCRIPTION OF THE DRAWINGS

Detailed description of preferred embodiments of the inventions will be made with reference to the accompanying drawings.

FIG. 5 is a top view of the restraining system illustrated in FIG. 1 in an installed state.

FIG. 6 is a perspective view of the restraining system illustrated in FIG. 1 in an installed state.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions.

Figure 1:
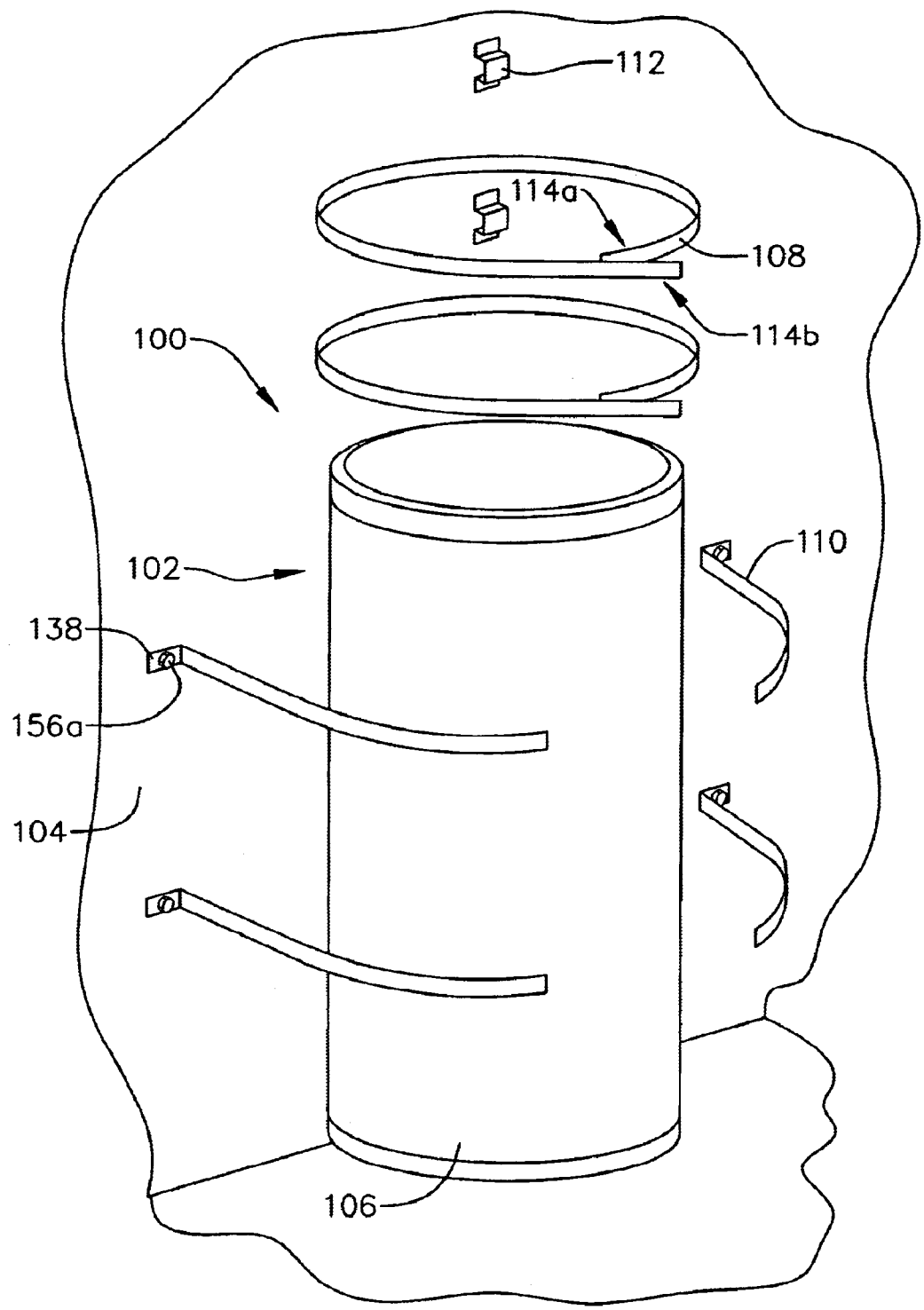
FIG. 1 is an exploded perspective view of a restraining system in accordance with a preferred embodiment of a present invention.

As illustrated for example in FIG. 1, a restraining system 100 in accordance with a preferred embodiment of a present invention may be used to secure an object 102 to a wall 104 or other support structure. The object 102 shown in conjunction with the exemplary embodiment is a water heater having a cylindrical outer wall 106 because the present inventions are particularly well suited for restraining water heaters. Nevertheless, a wide variety of objects may be restrained with the present inventions and the present inventions are not limited to use with any particular type of object. Such objects include those that are larger or smaller than a typical water heater, and those that have rectangular, square, elliptical, pentagonal or other non-circular cross-sectional shapes.

The exemplary retraining system 100 includes at least one encircling band 108 that is wrapped around the heater outer wall 106 and a pair of securing bands 110 that connect the encircling band to the wall 104. The bands are preferably flexible. A single encircling band 108 and corresponding pair of securing bands 110 together define a restraining unit. The number of restraining units will vary from application to application. The exemplary restraining system 100 illustrated in FIG. 1 includes two restraining units. Other restraining systems may include one, three, four or more restraining units if the intended application so requires. Each restraining unit may also be provided with a bracket 112 which, as described below with reference to FIGS. 3–4C is used to connect the encircling band 108 to the wall 104, and a plurality of fasteners (FIG. 10) to fasten the brackets and securing bands 110 to the wall.

Figure 3:
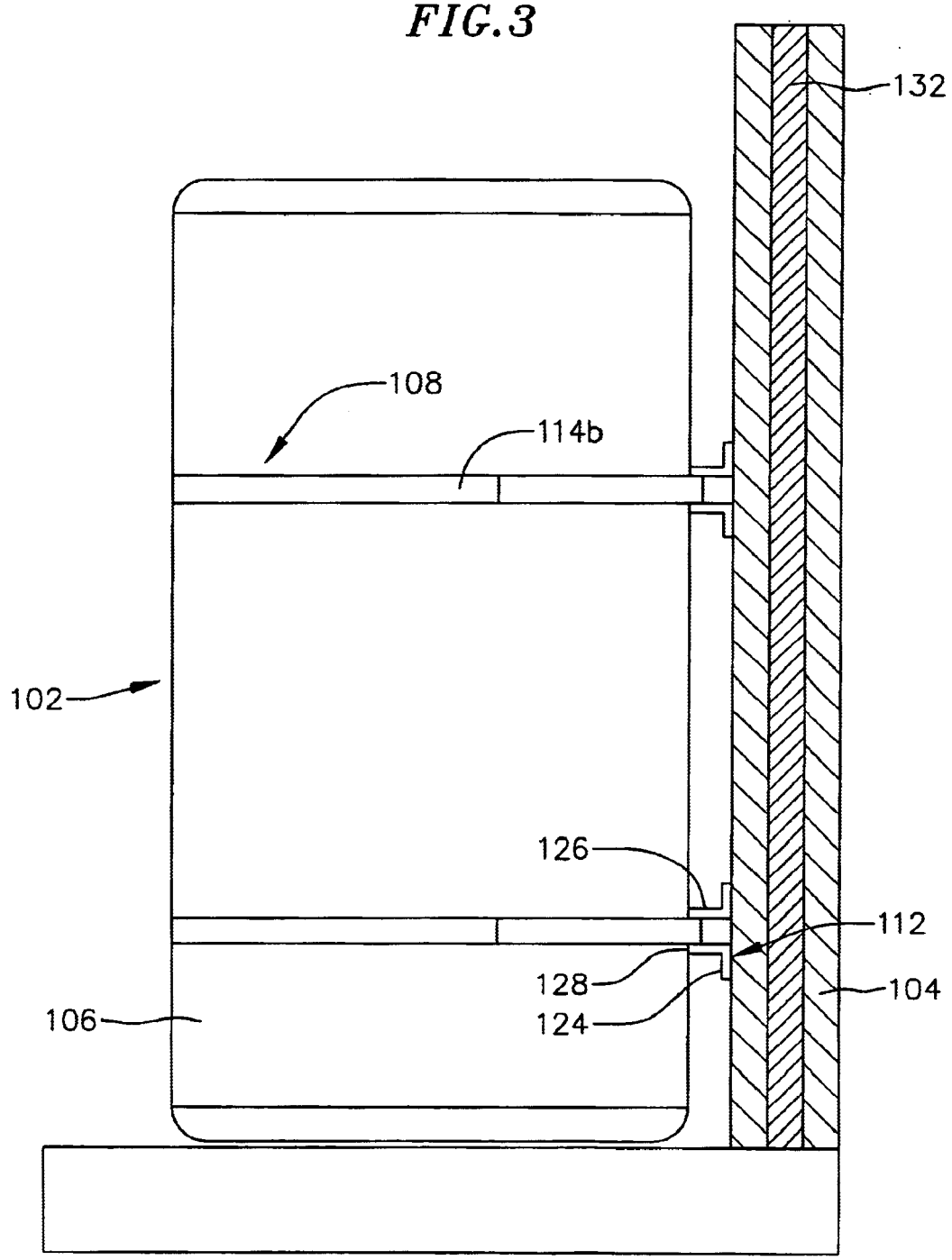
FIG. 3 is a side, partial section view of a portion of the exemplary restraining system illustrated in FIG. 1.
Figure 4A:
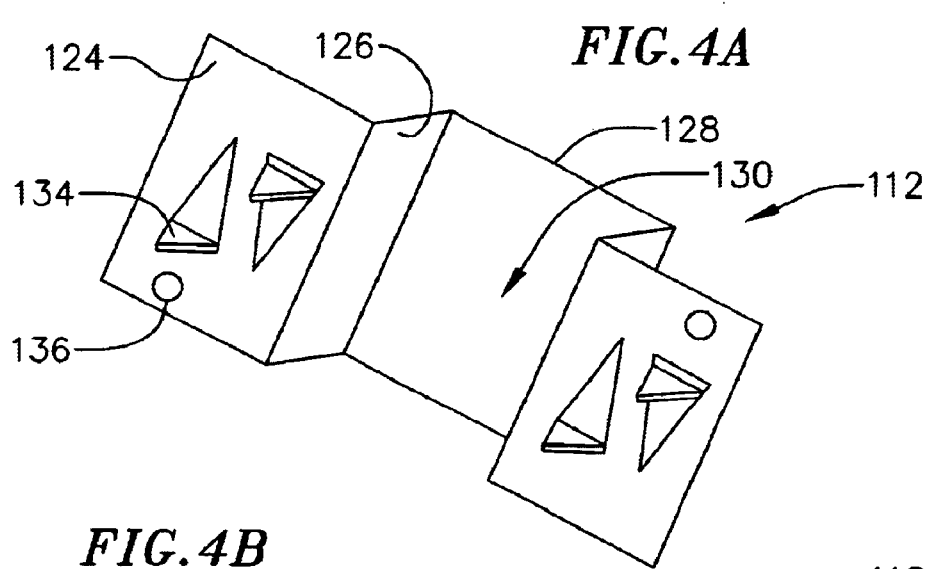
FIG. 4A is a perspective view of a bracket in accordance with a preferred embodiment of a present invention.
Figure 4B:
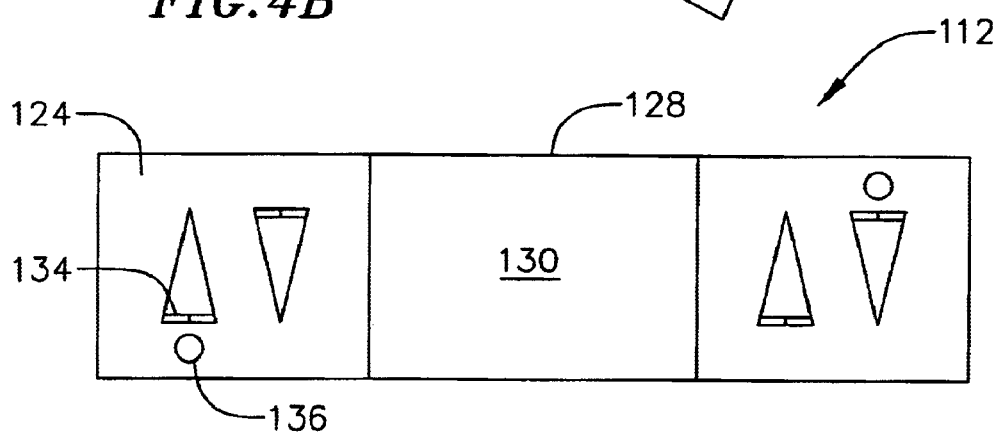
FIG. 4B is a bottom view of the bracket illustrated in FIG. 4A.
Figure 4C:
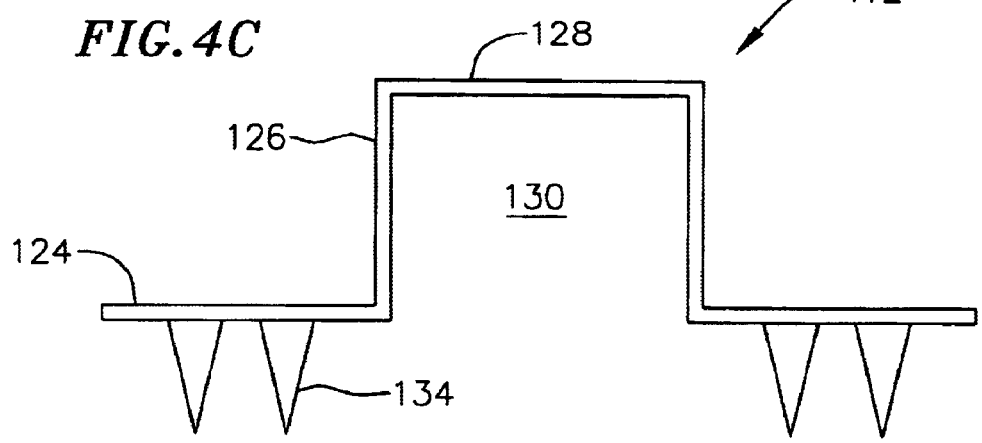
FIG. 4C is a side view of the bracket illustrated in FIG. 4A.

Once an encircling band 108 has been wrapped around the water heater outer wall 106, and preferably through an already installed bracket 112 as illustrated for example in FIGS. 3 and 5, the free end portions 114a and 114b must be connected to one another to hold the encircling band in place. The encircling band 108 should be tight enough, at some points of contact, to frictionally engage the water heater outer wall 106, but not so tight that it damages the outer wall. The free end portions 114a and 114b may be any suitable length. A length of at least about 6 to 12 inches is preferred for reasons that are discussed in detail below. In accordance with the present inventions, the exemplary encircling bands 108 are configured in such a manner that the free end portions 114a and 114b may be attached to one another without any additional instrumentalities. More specifically, the encircling bands 108 are provided with integral "lock" structures that can be used during installation to mechanically interlock the free end portions 114a and 114b to one another. As used herein, an "integral" structure is a structure that is either unitarily formed from a single piece of material or a unitary structure that is formed from two separate devices that are affixed to one another and not intended to be separated before or during normal use.

Figure 2A:
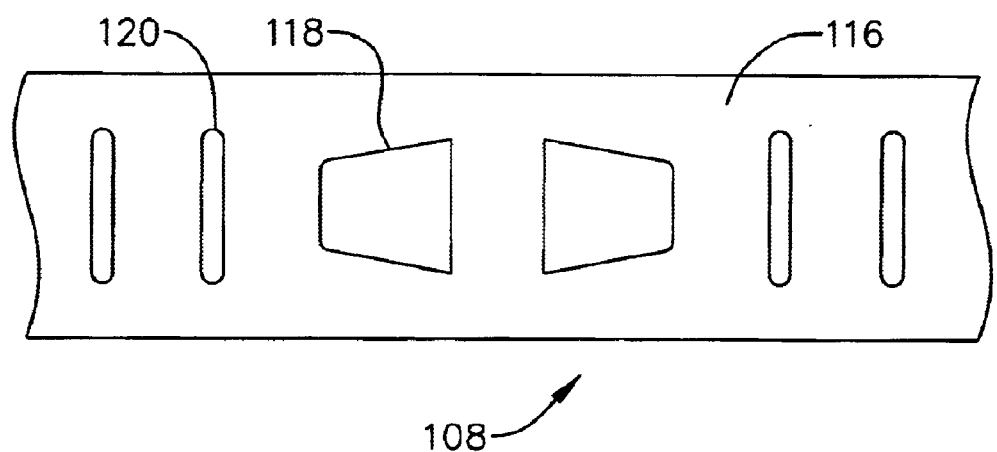
FIG. 2A is a plan view of a portion of an encircling band in accordance with a preferred embodiment of a present invention.
Figure 2B:
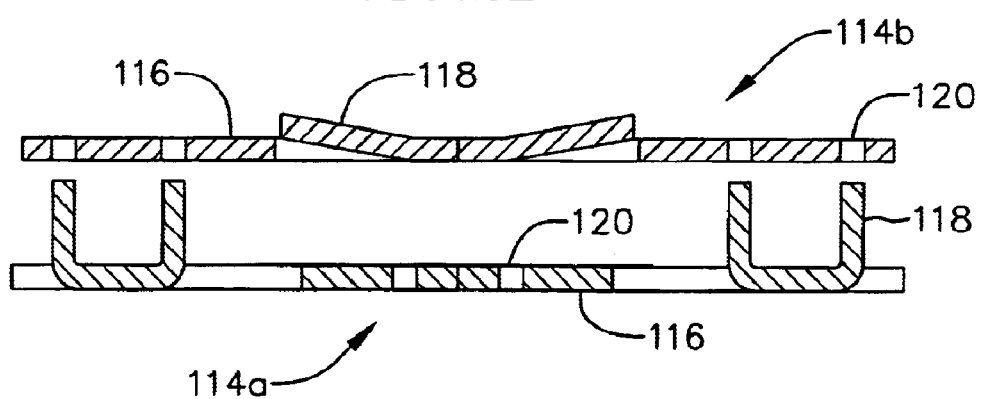
FIG. 2B is a section view showing two spaced, overlapping portions of the encircling band illustrated in FIG. 2A.

Referring to FIGS. 2A and 2B, the exemplary encircling bands 108 include a main body 116, a plurality of tabs 118 (or other appendages) and a plurality of receiving apertures 120. The tabs 118 and receiving apertures 120 are respectively sized and positioned such that the tabs may be inserted into and through apertures. The tabs 118 and receiving apertures 120 in the exemplary embodiment are also arranged in an alternating series of tab and aperture pairs which may extend along the entire length of the encircling bands 108, or be located only in those positions at which they will be needed. The tabs 118 in at least one of the tab pairs on the free end portion 114a will be bent from their original position, i.e. the position of the tabs on the free end portion 114b, to the position shown in FIG. 2B. The user will typically do the bending at the time of installation. The original positions of the tabs 118 may be slightly deflected positions, as they are in the exemplary implementation, so that the users can more readily grab the tabs with their fingers or a tool such as a pair of pliers.

Figure 2C:
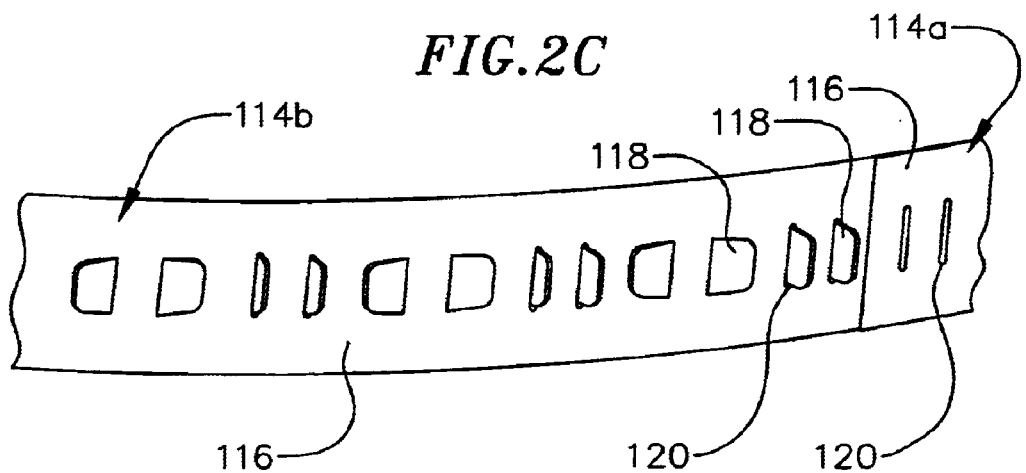
FIG. 2C is a perspective view showing the overlapping portions of the encircling band illustrated in FIG. 2A placed against one another.
Figure 2D:
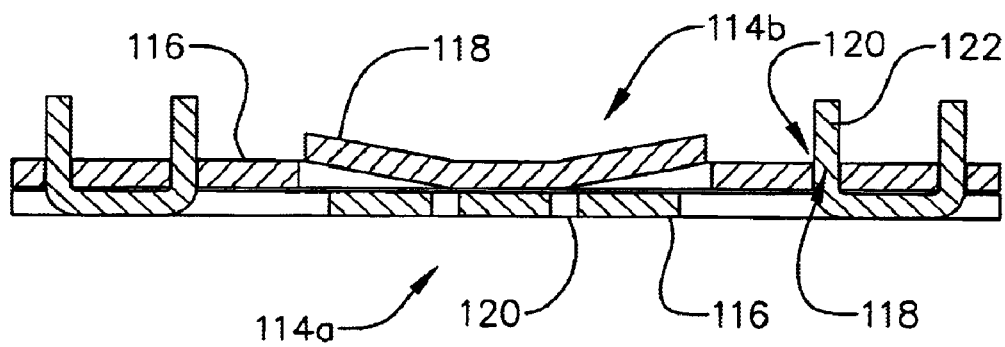
FIG. 2D is a section view showing the overlapping portions of the encircling band illustrated in FIG. 2A placed against one another.
Figure 2E:
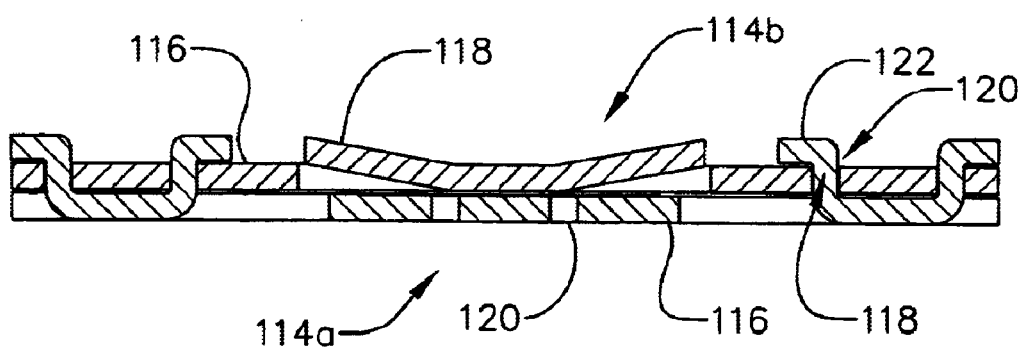
FIG. 2E is a section view showing the overlapping portions of the encircling band illustrated in FIG. 2A mechanically interlocked with one another.

After the free end portions 114a and 114b have been positioned in the spaced, overlapping orientation illustrated in FIG. 2B, the bent tabs 118 on the free end portion 114a will be aligned with, and inserted through, the apertures 120 in the free end portion 114b. [Note FIGS. 2C and 2D.] A portion 122 of each of the bent tabs 118 on the free end portion 114a will extend through and beyond the free end portion 114b. The tab portions 122 may then be bent to the positions illustrated in FIG. 2E to create a mechanical interlock between the free end portions 114a and 114b, which locks the encircling band 108 in place. Preferably, the tab portions 122 will be bent away from one another in the manner shown. The encircling band 108 may be unlocked by simply bending the tab portions 122 back to the position illustrated in FIGS. 2C and 2D.

The strength of the connection between the encircling band free end portions 114a and 114b is directly related to the number of tabs 118 that are used to mechanically interlock the free end portions. Given the exemplary materials and dimensions described below, three or more pairs of tabs will be used to attach the free end portions 114a and 114b to one another when, for example, a restraining system 100 including two restraining units is used in conjunction with a 50 gallon heater that is 56 inches in diameter. This equates to free end portions 114a and 114b that are about 6 to 12 inches in length.

As noted above, and referring to FIGS. 3–4C, brackets 112 may be provided to secure the encircling bands 108 to the wall 104. The exemplary brackets 112, which may be secured to the wall 104 during installation, include a pair of base members 124, a pair of side walls 126 and a connecting wall 128. The side walls 126 and connecting wall 128 together define an opening 130 through which the encircling band 108 is passed during installation. The water heater 102 or other object will preferably be positioned against the connecting wall 128 of each bracket 112 in the manner illustrated for example in FIG. 3. Thus, when the encircling bands 108 are locked in place, the water heater 102 or other object will be secured to the brackets 112 and, therefore, to the wall 104.

Although the brackets 112 may be configured for use with any type of wall or support structure, the wall in the exemplary implementation includes a plurality of studs 132 sandwiched between layers of drywall and the exemplary brackets are configured for use in this environment. At least one (and preferably both) of the base members 124 includes a pair of relatively sharp protrusions 134 and an aperture 136 for a fastener such a large nail. The sharp protrusions 134 may be driven through the drywall and into the stud 132 by the user during installation with a hammer. After the brackets 112 are properly positioned, the fasteners may be driven through the apertures 136 and drywall and into the stud 132.

Once the brackets 112 and encircling bands 108 are in place, the securing bands 110 may be attached to the encircling bands in the manner illustrated for example in FIGS. 5 and 6. More specifically, each of the exemplary securing bands 110 includes an end member 138, which may be secured to the wall 104 in the manner described below with reference to FIG. 10, and a connected region 140, which may be connected to the encircling band 108 in the manner described below with reference to FIGS. 7A and 7B. The securing band connected region 140 is preferably connected to the encircling band 108 from a point 142 that is just beyond one end of the water heater wide point WP (relative to wall 104) to a point 144 that is near the end of the securing band 110. As such, in the exemplary implementation, the securing band connected region has a length that is approximately equal to ¼ of the water heater circumference. The end members 138 should be spaced outwardly from the ends of the water heater wide point WP by at least about 2–3 inches as shown in FIG. 5. [Of course, the exact position of the end members 138 will be determined by the location of the studs 132 within the wall 104.]

Such an arrangement of the encircling band 108 and the securing bands 110 provides contact points at the center left and right of the water heater 102 and prevents a wide variety of potential object movement. Horizontal movement of the water heater 102 away from the wall 104 is prevented, as is rotational movement of the water heater. The water heater 102 will also be prevented from tipping over.

Figure 7A:
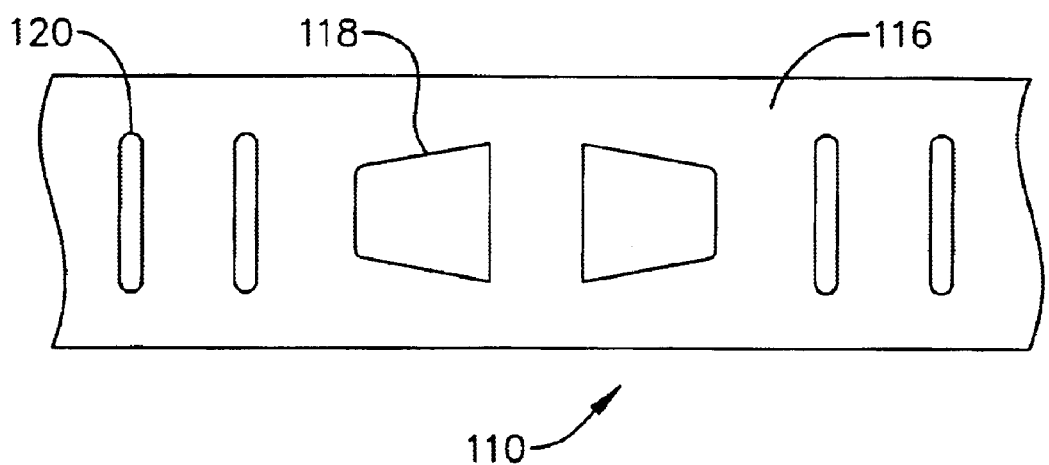
FIG. 7A is a plan view of a portion of a securing band in accordance with a preferred embodiment of a present invention.
Figure 7B:
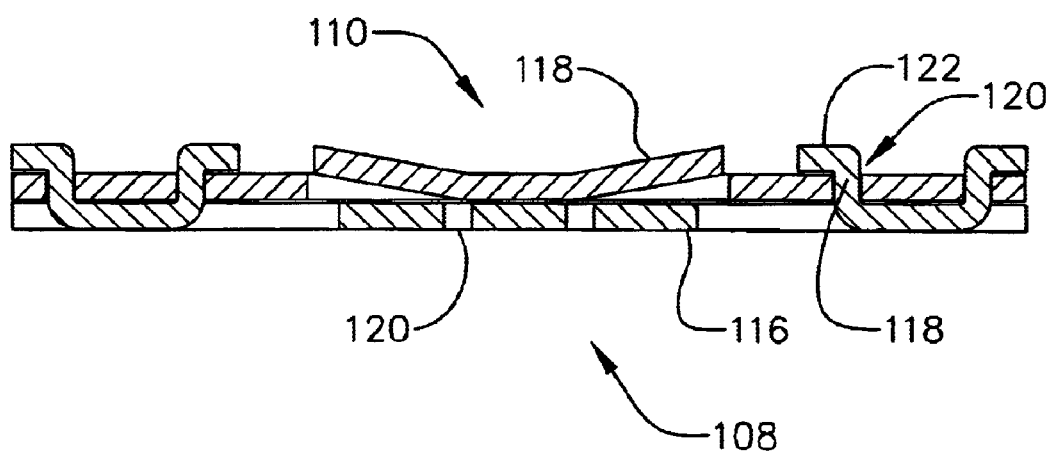
FIG. 7B is a section view showing the securing band illustrated in FIG. 7A mechanically interlocked with an encircling band.

But for their length and the presence of the end members 138, the exemplary securing bands 110 are substantially identical in structure to the exemplary encircling bands 108. As illustrated in FIG. 7A, the exemplary securing bands 110 include a main body 116 and respective pluralities of tabs 118 and receiving apertures 120 that are arranged in an alternating series of tab and aperture pairs. The alternating series of tab and aperture pairs may extend along the entire length of the securing bands 110, or be located only in those positions at which they will be needed.

The tabs 118 on the exemplary encircling bands 108 and the receiving apertures 120 on the exemplary securing bands 110 are respectively sized and located such that the tabs may be inserted into and through receiving apertures. As such, a securing band 110 may be attached to an encircling band 108 in the same manner that the encircling band free end portions 114a and 114b were attached to one another. The tabs 118 on the encircling band 108 that are coextensive with the securing band connected region 140 will be bent from their original positions. The apertures 120 in the securing band connected region 140 will then be aligned with the encircling band tabs 118 so that the securing band 110 can be pressed onto the encircling band 108. The tab portions 122 will then be bent (preferably to the positions illustrated in FIG. 7B) to create a mechanical interlock between the encircling band 108 and the securing band 110. The process is repeated for each of the securing bands 110.

The strength of the connection between an encircling band 108 and a securing band 110 is directly related to the number of tabs 118 that are used to mechanically interlock the two. Given the exemplary materials and dimensions described below, three pairs of tabs (i.e. each of the encircling band tabs 118 that are coextensive with the securing band connected region 140) will be used to attach an encircling band 108 to a securing band 110 when, for example, a restraining system 100 including two restraining units is used in conjunction with a 50 gallon heater that is 56 inches in diameter.

Figure 8A:
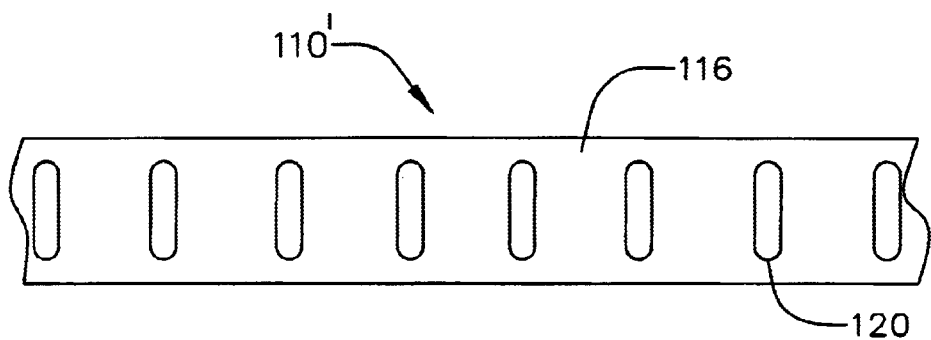
FIG. 8A is a plan view of a portion of a securing band in accordance with a preferred embodiment of a present invention.
Figure 8B:
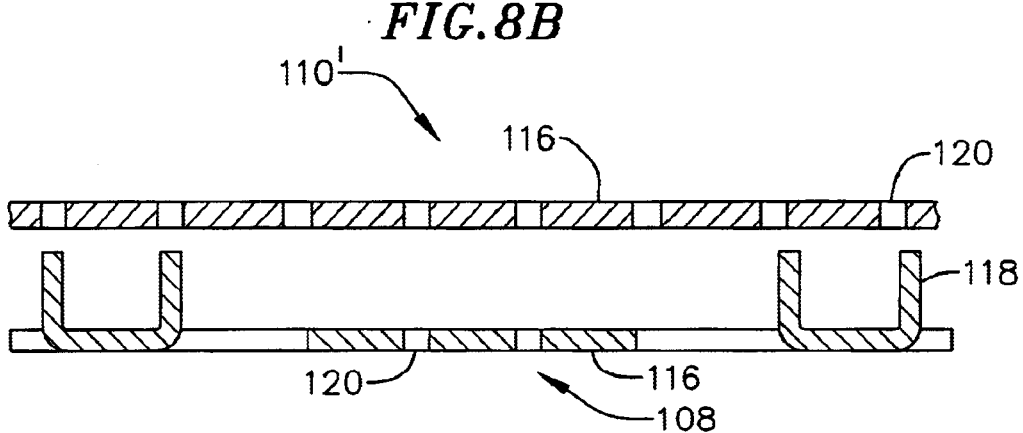
FIG. 8B is a section view showing the securing band illustrated in FIG. 8A and an encircling band.
Figure 8C:
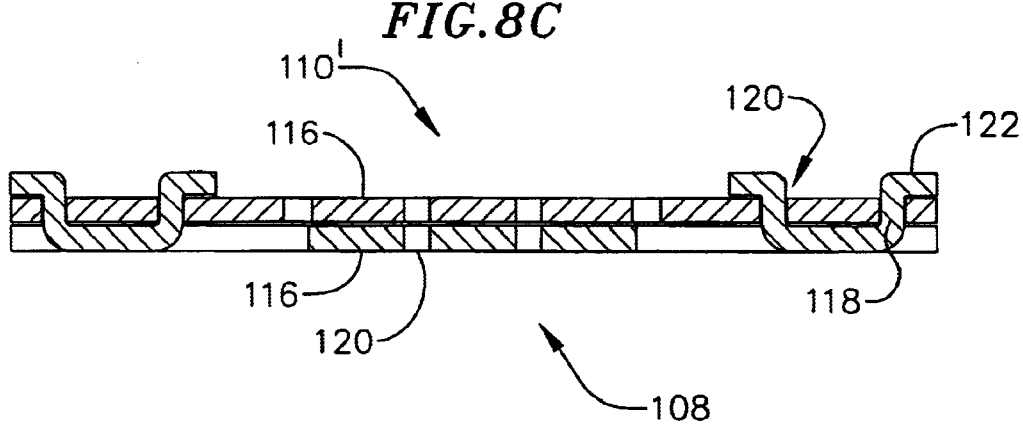
FIG. 8C is a section view showing the securing band illustrated in FIG. 8A mechanically interlocked with an encircling band.

The structure of the exemplary securing bands 110 is substantially identical to the exemplary encircling bands 108 to simplify the manufacturing process. However, as is clear from the description above, the tabs 118 on the securing bands 110 are not used. Accordingly, an alternative securing band configuration that lacks tabs 118 may be provided. The exemplary securing band 110' illustrated in FIG. 8A includes a main body 116 and a plurality of receiving apertures 120 which may extend along the entire length of the securing band, or be located only in those positions at which they will be needed. The lack of tabs 118 in the securing band 110' increases the number of receiving apertures 120 and, accordingly, increases the adjustability of the securing band during the installation process. As illustrated for example in FIGS. 8B and 8C, the securing band 110' may be attached to an encircling band 108 in the same way that a securing band 110 is attached to the encircling band. The securing band 110' is placed over the encircling band 108 such that the encircling band tabs 118 pass through the securing band receiving apertures 120. The tab portions 122 are then bent (preferably to the positions illustrated in FIG. 8C) to create a mechanical interlock between the encircling band and the securing band.

In another alternate configuration (not shown), an encircling band may be configured such that the free end portions include the aforementioned alternating series of tab and aperture pairs arrangement. The region between the free end portions, however, would include only a continuous series of tabs, thereby increasing the number of tabs, as compared to the encircling band 108, and adjustability during the installation process.

Figure 9:
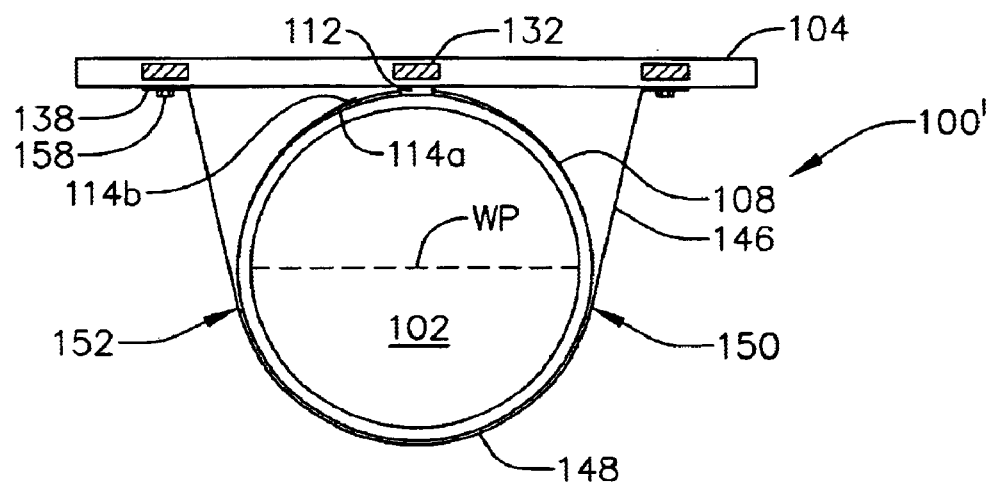
FIG. 9 is a top view of a restraining system in accordance with a preferred embodiment of a present invention.

Turning to FIG. 9, in an alternative restraining system 100', which is otherwise identical to exemplary restraining system 100, a single relatively long securing band 146 may used in place of a pair of the aforementioned securing bands 110 and 110' in a restraining unit. The securing band 146 may be configured and connected to an encircling band 108 in the same manner as either of the securing bands 110 and 110'. More specifically, the securing band 146 will be connected to the encircling band 108 along a connected region 148, which extends from a point 150 that is just beyond one end of the water heater wide point WP to a point 152 that is just beyond the other end of the water heater wide point WP, through the use of the tabs 118 on the encircling band and the apertures 120 in the securing band.

The length of the securing band 146 will, of course, be predefined based on the expected size of the water heater 102 or other object and the environment in which the restraining system 100' will be used. Should the securing band 146 be improperly sized for the intended application, the user may simply cut the securing band in half to provide a restraining system similar to the exemplary restraining system illustrated 100 in FIGS. 1–8).

Figure 10:
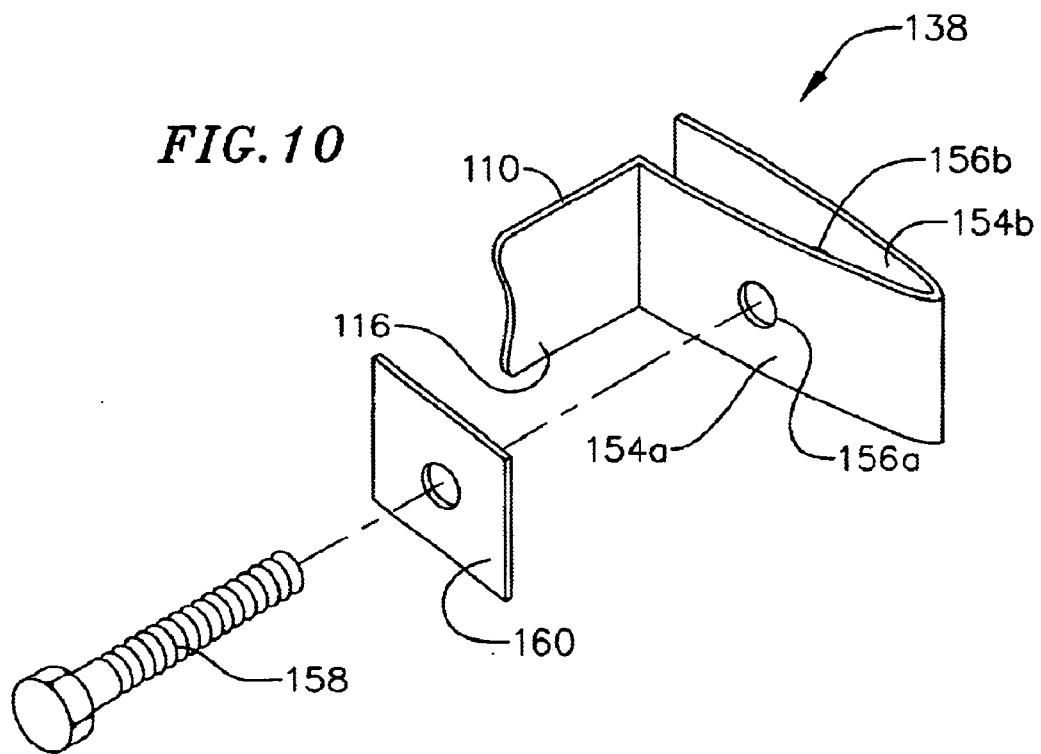
FIG. 10 is an exploded perspective view of a securing band end member, a washer and a fastener in accordance with a preferred embodiment of a present invention.

Although the present inventions are not limited to the use of any particular structure or device for attaching the securing bands 110, 110' and 146 to the wall 104, the exemplary end member 138 illustrated in FIG. 10 is preferred. The exemplary end member 138 consists of a length of the securing band main body 116 (preferably about 3 inches)

that is folded in half, thereby creating two end member portions 154*a* and 154*b*. Fastener holes 156*a* and 156*b* that may be formed during the manufacturing process extend through each of the end member portions 154*a* and 154*b* so that a fastener 158 may be driven into the wall 104 (and preferably into a stud 132) through the end member 138 to hold the securing band in place in the manner illustrated in FIGS. 5, 6 and 9. A washer, such as the exemplary rectangular washer 160, a square washer, or an annular washer, may also be provided.

The present inventions are not limited to any particular materials, dimensions and manufacturing processes. Nevertheless, the various elements of the exemplary restraining systems should have certain characteristic. For example, the materials and dimensions of a two restraining unit implementation intended to be used with a conventional residential water heater should result in a restraining system that will not fail during an earthquake due to breakage of the encircling and securing bands, failure of the mechanical interlock therebetween, or failure of the devices that attach the bands to the wall. Referring more specifically to the tabs 118, the tabs should be malleable so that they can be bent by the user from their original positions to the positions illustrated in FIGS. 2D and 2E without springing back when released. Thus, the stiffness of the tabs 118 must be low enough to allow the shaft to be bent, either with the user's finger or with a tool such as a pair of pliers, but high enough to resist bending from the positions illustrated in FIG. 2E to the positions illustrated in FIG. 2D when the forces associated with an earthquake are applied to a restraining system.

In accordance with certain exemplary implementations of the present inventions, the restraining systems illustrated in FIGS. 1–10 may be constructed as follows. The exemplary encircling bands 108 are preferably formed from about 6 to 12 foot lengths of galvanized steel that are about 1.5 inches inch wide and about 0.025 inch to about 0.016 inch thick (i.e. about 22–26 gauge). Any excess length may be cut off before, during or after the installation process. The galvanized steel is preferably commercial quality or softer with a maximum Rockwell Hardness (B scale) of 70. The exemplary tabs 118 are about 0.375 inch long (measured along the longitudinal axis of the band) and about 0.5 inch wide at their widest point, while the exemplary receiving apertures are about 0.064 inch long and about 0.626 inch wide. There is also about 0.375 inch between the tabs 118 in each pair, 0.375 inch between apertures 120 in each pair, and about 0.375 inch between adjacent tabs and apertures. The securing bands 110 are preferably about 4 to 6 feet in length and, but for the end members 138, are otherwise identical to the encircling bands 108. The securing bands 110' are preferably about 4 to about 6 feet in length and, but for the end members 138 and the replacement of the tabs 118 with receiving apertures 120, otherwise identical the encircling bands 108. The securing bands 146 are preferably about 8 to about 12 feet in length are otherwise identical to the encircling bands 108. It should be noted, however, that the need securing bands 110, 110' and 146 may be substantially different than the encircling bands 108 with respect to size, shape and materials if a particular application so requires.

The encircling bands 108 and securing bands 110, 110' and 146 may be manufactured using processes such as metal stamping and punch processing.

Turning to the brackets, the exemplary brackets 112 are formed from galvanized steel that is about 0.051 inch to about 0.032 inch thick (i.e. about 16–20 gauge). The overall width of the brackets in the exemplary embodiment is about 4.125 inches (measured side to side in FIG. 4C), while the width of the opening 130 is about 1.625 inches, i.e. slightly larger than the width of the encircling band 108. The height of the opening 130 (measured from the wall 104 to the connecting wall 128) is about 1.29 inches, while the length of the opening (measured top to bottom in FIG. 4B) is about 1 inch. The sharp protrusions 134 are about 0.7 inch (measured top to bottom in FIG. 4C). The brackets 112 may be manufactured using processes such as metal stamping and punch processing.

The fasteners 158 in the exemplary embodiments are preferably screws such as, for example, hex-head self-drilling screws which allow the installer to use a crescent wrench or socket wrench to create the necessary degree of leverage. A suitable length for most residential applications is 2.75 inches. Of course, other types of suitable fasteners may be used. The washer 160 is preferably about 1.5 inch×1 inch×0.19 inch and formed from steel.

Figure 11:
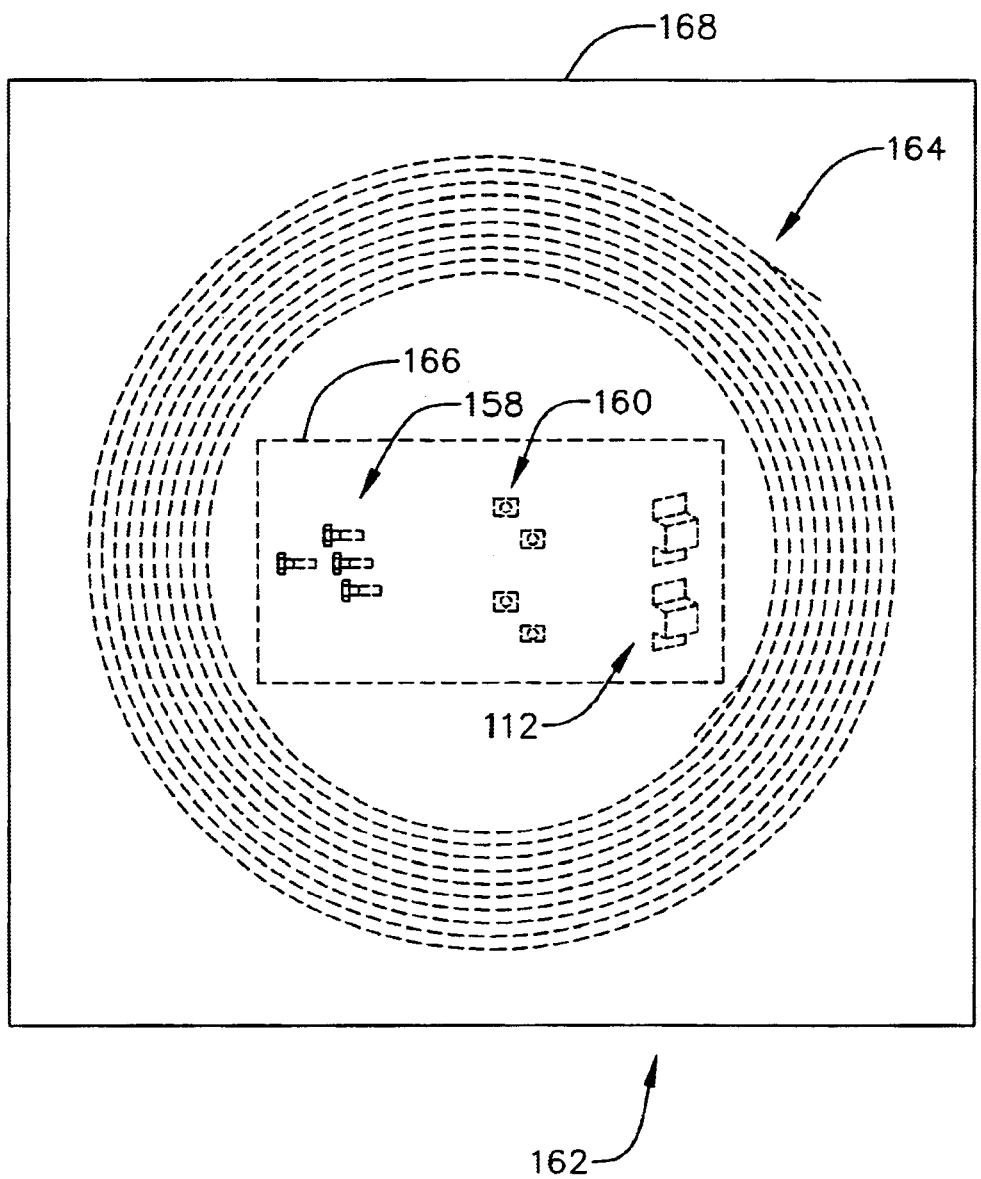
FIG. 11 is a plan view of a kit in accordance with a preferred embodiment of a present invention.

In accordance with another invention herein, and as illustrated for example in FIG. 11, the present restraining system 100 (or 100') may be packed in a kit 162 which includes, for example, two encircling bands 108 and four securing bands 110 may be loosely rolled one inside the other into an annularly-shaped group of bands 164. The brackets 112, fasteners 158 and washers 160 may be stored in a plastic bag 166 or other suitable container. The group of bands 164 and the plastic bag 166 are stored with a container 168, such as a cardboard box or a plastic bag.

Although the present inventions have been described in terms of the preferred embodiments above, numerous modifications and/or additions to the above-described preferred embodiments would be readily apparent to one skilled in the art.

By way of example, but not limitation, the brackets 112 and/or securing band ends 138 may be reconfigured so that they can be connected to a pipe or other anchoring device if particular applications so require. The brackets 112 may also be reconfigured such that the object may be placed in a corner. The shapes of the tabs 118 and apertures 120 may also be changed as desired. Additionally, the encircling band 108 may be eliminated and the ends of each pair of securing bands 110 simply attached to one another using the tabs 118 and apertures 120.

It is intended that the scope of the present inventions extends to all such modifications and/or additions.

I claim:

1. An apparatus for restraining an object, the apparatus comprising:

at least one securing band including a securing band main body portion and a plurality of securing band apertures; and at least one encircling band including an encircling band main body portion, a plurality of longitudinally spaced encircling band apertures and a plurality of encircling band appendages adapted to be received by the encircling band apertures and the securing band apertures, wherein the encircling band apertures and encircling band appendages are arranged in respective encircling band aperture pairs and encircling band appendage pairs.

2. An apparatus as claimed in claim 1, wherein the encircling band appendages are integral with the encircling band main body.

3. An apparatus as claimed in claim 1, wherein encircling band appendages are malleable.

4. An apparatus as claimed in claim 1, where the at least one securing band comprises at least two securing bands.

5. An apparatus as claimed in claim 1, where the at least one encircling band comprises at least two encircling bands.

6. An apparatus as claimed in claim 1, further comprising:
a bracket adapted to be secured to a support structure and defining an opening configured to receive the at least one encircling band.

7. An apparatus as claimed in claim 1, wherein the at least one securing band comprises only one securing band which defines the total length.

8. An apparatus as claimed in claim 1, wherein the at least one securing band comprises a pair of securing bands which together define the total length.

9. An apparatus for restraining an object, comprising:
at least one securing band including a securing band main body portion and a plurality of securing band apertures and a plurality of securing band appendages; and
at least one encircling band including an encircling band main body portion, a plurality of longitudinally spaced encircling band apertures and a plurality of encircling band appendages adapted to be received by the encircling band apertures and the securing band apertures,
wherein the securing band apertures and securing band appendages are arranged in respective securing band aperture pairs and securing band appendage pairs.

10. An apparatus as claimed in claim 9, wherein the securing band appendages are integral with the securing band main body.

11. An apparatus as claimed in claim 9, wherein the securing band appendages are malleable.

12. An apparatus for restraining an object, the apparatus comprising:
at least two restraining units, each restraining unit including
at least one securing band including a securing band main body portion and a plurality securing band apertures, and
an encircling band including an encircling band main body portion, a plurality of longitudinally spaced encircling band apertures and a plurality of malleable encircling band appendages that are integral with the main body and adapted to be received by the encircling band apertures and the securing band apertures, the encircling band apertures and encircling band appendages being arranged in an alternating series of encircling band aperture pairs and encircling band appendage pairs.

13. An apparatus as claimed in claim 12, wherein each restraining unit includes a bracket adapted to be secured to a support structure and defining an opening configured to receive the encircling band.

14. An apparatus as claimed in claim 12, wherein the at least one securing band comprises only one securing band which defines the total length.

15. An apparatus as claimed in claim 12, wherein the at least one securing band comprises a pair of securing bands which together define the total length.

16. An apparatus for restraining an object, comprising:
at least two restraining units, each restraining unit including
a pair of securing bands, each securing band including a securing band main body portion and a plurality securing band apertures, and
an encircling band including an encircling band main body portion, a plurality of longitudinally spaced encircling band apertures and a plurality of malleable encircling band appendages that are integral with the main body and adapted to be received by the encircling band apertures and the securing band apertures,
the encircling band apertures and encircling band appendages being arranged in an alternating series of encircling band aperture pairs and encircling band appendage pairs.

17. A method of securing an object to a support structure, comprising the steps of:
wrapping an encircling band, including a plurality of longitudinally spaced encircling band apertures and a plurality of encircling band appendages, around the object;
positioning a securing band, defining first and second longitudinal end portions and including a plurality of longitudinally spaced securing band apertures, onto the encircling band such that a portion of at least one of the encircling band appendages extends through one of the securing band apertures;
bending the portion of the at least one encircling band appendage that extends though one of the securing band apertures; and
securing at least one of the longitudinal end portions of the securing band to the support structure.

18. A method as claimed in claim 17, wherein the encircling band defines first and second longitudinal end portions and includes a plurality of encircling band apertures, the method further comprising the steps of:
positioning the first longitudinal end portion of the encircling band onto the second longitudinal end portion of the encircling band such that a portion of at least one of the encircling band appendages on the second longitudinal end portion of the encircling band appendages extends through one of the encircling band apertures on the first longitudinal end portion of the encircling band; and
bending the portion of the at least one encircling band appendage that extends though one of the encircling band apertures.

19. A method as claimed in claim 18, wherein the at least one encircling band appendage extending through one of the encircling band apertures comprises a pair of encircling band appendages extending through a pair of encircling band apertures and the step of bending the portion of the at least one encircling band appendage comprises bending the encircling band appendages in the pair in opposite directions.

20. A method as claimed in claim 19, wherein the pair of encircling band appendages comprises a plurality of pairs of encircling band appendages the step of bending the portion of the at least one encircling band appendage comprises bending the encircling band appendages in each pair in opposite directions.

21. A method as claimed in claim 17, wherein the at least one encircling band appendage extending through one of the securing band apertures comprises a pair of encircling band appendages extending through a pair of securing band apertures and the step of bending the portion of the at least one encircling band appendage comprises bending the encircling band appendages in the pair in opposite directions.

22. A method as claimed in claim 21, wherein the pair of encircling band appendages comprises a plurality of pairs of encircling band appendages the step of bending the portion of the at least one encircling band appendage comprises bending the encircling band appendages in each pair in opposite directions.

23. A method as claimed in claim 17, further comprising the steps of:
wrapping a second encircling band, including a plurality of longitudinally spaced encircling band apertures and a plurality of encircling band appendages, around the object;

positioning a second securing band, defining first and second longitudinal end portions and including a plurality of longitudinally spaced securing band apertures, onto the second encircling band such that a portion of at least one of the encircling band appendages extends through one of the securing band apertures;

bending the portion of the at least one encircling band appendage that extends though one of the securing band apertures; and securing at least one of the longitudinal end portions of the second securing band to the support structure.

24. A method as claimed in claim 17, wherein the step of securing at least one of the longitudinal end portions of the securing band to the support structure comprises securing both of the longitudinal end portions of the securing band to the support structure.

25. A method as claimed in claim 17, wherein the step of securing at least one of the longitudinal end portions of the securing band to the support structure comprises driving a fastener through the at least one longitudinal end portion and into the support structure.

26. A method as claimed in claim 17, further comprising the step of:

securing a bracket to the support structure;

wherein the step of wrapping an encircling band around the object comprises passing the encircling band through the bracket.

* * * * *